Feb. 27, 1934.    C. L. FORTIER    1,948,574
AIRCRAFT
Filed March 6, 1933
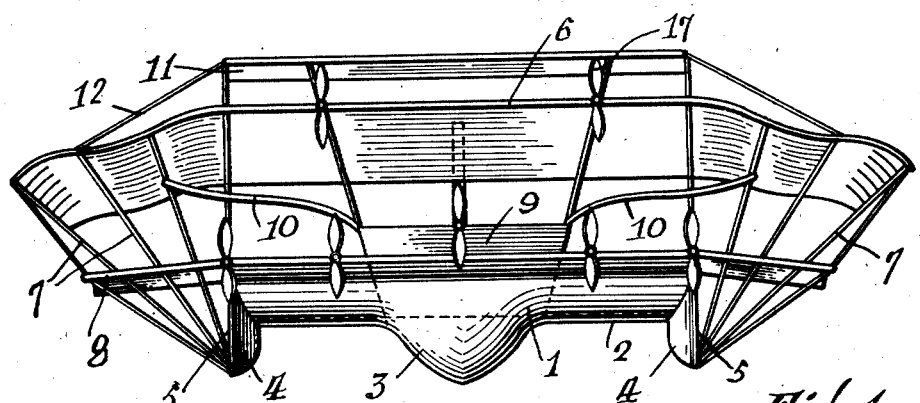
Fig. 1
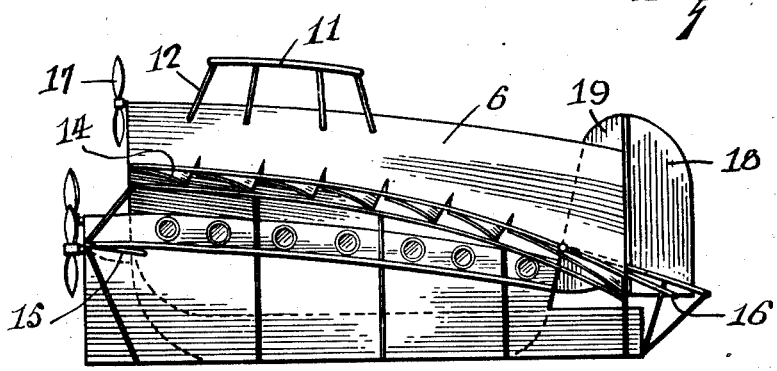
Fig. 2
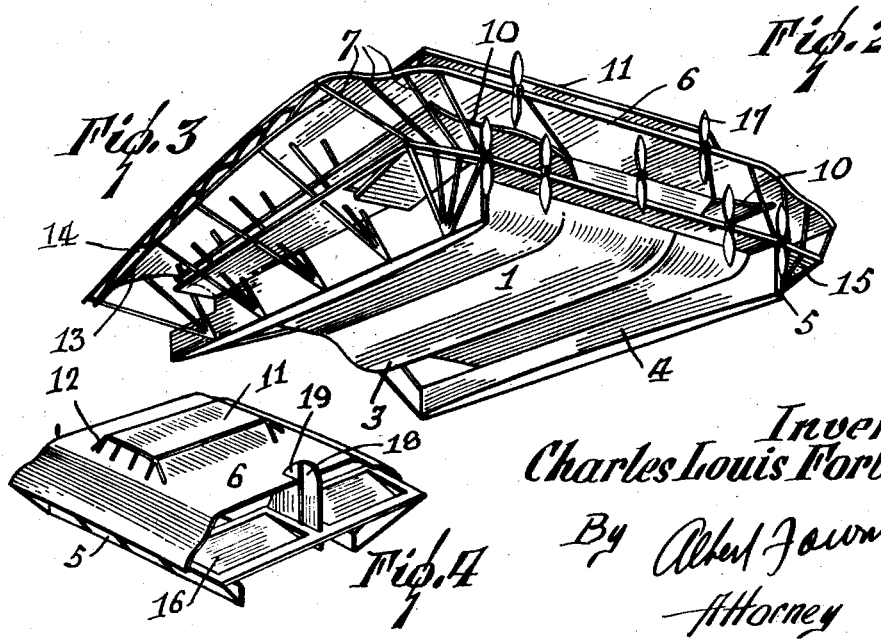
Fig. 3
Fig. 4
Inventor:
Charles Louis Fortier
By Albert Fournier
Attorney Patented Feb. 27, 1934

1,948,574

UNITED STATES PATENT OFFICE 1,948,574

AIRCRAFT

Charles Louis Fortier, Montreal, Quebec, Canada

Application March 6, 1933. Serial No. 659,602

4 Claims. (Cl. 244—14)

The present invention pertains to a novel aircraft of the heavier-than-air type and the principal object of the invention is to provide a safe and stable vessel having a large carrying capacity.

This object is accomplished essentially by a novel system of fuselage and wing construction, affording broad horizontal surfaces to sustain large loads. One of the particular characteristics of the invention is a body or fuselage having a broad bottom which in itself serves as a wing or flying surface.

A machine built according to the invention is amphibian in character. Although it is contemplated that the extremely large sizes take off from the water and land on water, thus requiring no landing gear, the smaller sizes may be equipped with conventional landing gear.

The invention embodies numerous other novel features of construction, and these will be considered as the detailed description develops.

The invention is fully disclosed by way of example in the following description and in the accompanying drawing, in which Figure 1 is a front elevation of an aeroplane constructed according to the invention;

Figure 2 is a side elevation thereof;

Figure 3 is a perspective view showing the under structure; and

Figure 4 is a perspective view showing the top and rear end.

Reference to these views will be made by use of like characters which are employed to designate corresponding parts throughout.

The body or fuselage is indicated by the numeral 1 and is shown to have a comparatively wide bottom 2. In the axis of the bottom is built a keel 3 and at the longitudinal edges are semi-keels 4 presenting vertical outward sides 5, which constitute a funnel shape attack of the air current.

The main plane is designated by the numeral 6 and will be seen to be substantially horizontal and wider than the entire fuselage 1 and considerably curved downwardly toward the stern. This plane is supported by sets of props 7 anchored on the side walls 5 and divergently extending to the longitudinal margin of the plane 6 at the parts thereof which overlap the fuselage 1. This construction is clearly illustrated in Figures 1 and 3.

A lower plane 8 is provided approximately at the upper edge of the fuselage 1 and projects laterally and forwardly from said edge as shown more clearly in Figures 1 and 3. A cabin or boat-like passenger compartment 9 is built along the longitudinal center of the fuselage 1 and preferably above the keel 3 as shown in Figures 1 and 2. On the inside, the hull may be provided with an interior double bottom and part 2 may be arranged to be used as tank or reservoir for carrying fuel or freight. The cabin is designed to accommodate the engines and other elements of the propelling apparatus and suitable accommodation for package and freight. Intermediate and lateral wings 10, suitably shaped to act as air accumulators and supporters, extend from the longitudinal upper edges of the cabin 9 as shown in Figures 1 and 3.

Upon the main plane 6 is mounted a gravity or stabilizing wing 11 by means of props 12, preferably near the forward end of the craft. This member is positioned in the center of gravity of the craft and cooperates with the fore and aft elevators as will presently appear.

Beneath the longitudinal edges of the main plane 6 are supported rods 13 in spaced relation thereto. These rods co-operate with the aforementioned edges in supporting a series of stationary ailerons 14 at each side of the craft as shown in Figures 1, 2 and 3 to accumulate air currents and force them under the main wing.

Adjustable elevators 15 and 16 are provided respectively at the bow and stern of the craft, at each side thereof and are pivoted on stationary parts. These members may be operated by any suitable controls in the cabin or pilot's compartment and co-operate with the upper wing 11 which is air-free at all its edges. The craft being of such comparatively large width, has a multiple propeller equipment, and propellers 17 are supported at the forward edges of the planes 6 and 8 as illustrated in Figures 1, 2 and 3. These are preferably driven from a central power plant, but may have individual motors if desired.

At the stern of the vessel is mounted a rather large vertical rudder 18 pivotally supported by a tail 19 built up from the body 1. The rudder also is operated from suitable controls in the cabin or pilot's compartment.

Among the more important characteristics of the invention, it may be stated that the large amount of horizontal flying surface throughout the craft enables the carrying of great motive power and further contributes to the buoyancy and stability of the vessel. Thus, the craft has a large cargo and fuel capacity so as to be reliable on long flights and may be adequately equipped with search lights, radio, muffler apparatus and other accessories without consuming a large proportion of the available load capacity. The novel system of construction and arrangement of the body and wings furnishes not only a large total lifting capacity but also a large lifting capacity per square foot of area.

The fuselage and wings are built on the bridge style regardless of weight and are durably, interconnected, with powerful struts and steel cables forming a compact and rigid vessel so that the wings will not curl or break off and are adapted for the transportation of heavy loads over long distances and with safety.

The broad bottom of the vessel is adapted for safe water navigation, rendering the vessel amphibian in character. Thus, in trans-oceanic flights, part of the voyage may be made on water, or the vessel may land on the water for refueling, loading or unloading, and repairs or replacements if necessary or desired.

It will be seen by the construction and positioning of the body, that the center of gravity is brought to a low point, thus improving the stability and balance. Powerful elevators at the nose and tail, as well as the ailerons, contribute to the balance and stability. Thus, nose dive, tail spin, side drop and overturning are practically impossible. The broad bottom makes possible a quick take-off on an even keel and safe landing at low speeds. This bottom in fact functions as a wing which facilitates the take-off and landing, particularly in making a landing at low speed.

Larger vessels can land easier and more efficiently on water and for this reason no landing gear is illustrated herein. However, the smaller vessels may be equipped with conventional collapsible landing gear.

It will be understood in this connection that an aeroplane embodying the principles of this invention may be made in any size and that the invention is not limited to any particular size of vessel. For purposes of illustration, it may be stated that a comparatively small size machine according to the invention having a total flying surface of 8,240 square feet has a lifting capacity of 70 tons.

Ailerons may be installed in any parts of the machine if desired.

The controls may be of any preferred form, and in this connection it is desired to point out that the ailerons are not needed for control but only for stabilization. It will be evident that the body or fuselage may be built to provide several compartments for the freight, mail, fuel and oil tanks, passengers and other equipment required for the operation of the vessel.

It will be also understood that the invention embodies means wherein the wings can not break off, that the gravity construction (center and bottom heavy) permits an even keel travel, and that the small wings direct air currents to the main wing as a new flying principle.

Although a specific embodiment of the invention has been illustrated and described, it will be understood that various alterations in the details of construction may be made without departing from the scope of the invention, as indicated by the appended claims.

What I claim is:—

1. Aircraft comprising a body having a broad horizontal bottom surface, a main plane supported over said body and overlapping the same laterally, a lower plane extending laterally from said bottom, propellers carried by said plane, elevating and steering means carried by said body, a keel projecting downwardly from the bottom of said body in the longitudinal center thereof, and semi-keels projecting downwardly from the longitudinal edges of said bottom.

2. Aircraft comprising a body having a broad horizontal bottom surface, a main plane supported over said body and overlapping the same laterally, a lower plane extending laterally from said bottom, propellers carried by said plane, elevating and steering means carried by said body, a keel projecting downwardly from the bottom of said body in the longitudinal center thereof, semi-keels projecting downwardly from the longitudinal edges of said bottom, and props and steel cables extending upwardly from the said semi-keels and supporting the overlapping parts of said main plane.

3. Aircraft comprising a body having a broad horizontal bottom surface, a main plane supported over said body and overlapping the same laterally, a lower plane extending laterally from said bottom, propellers carried by said plane, elevating and steering means carried by said body, a keel projecting downwardly from the bottom of said body in the longitudinal center thereof, semi-keels projecting downwardly from the longitudinal edges of said bottom, and wings extending outwardly and upwardly from the longitudinal edges of said body and disposed between said planes.

4. Aircraft comprising a body having a broad horizontal bottom surface, a main plane supported over said body and overlapping the same laterally, a lower plane extending laterally from said bottom, propellers carried by said plane, elevating and steering means carried by said body, a keel projecting downwardly from the bottom of said body in the longitudinal center thereof, said body in the longitudinal center thereof, semi-keels projecting downwardly from the longitudinal edges of said bottom, props and steel cables extending upwardly from the said semi-keels and supporting the overlapping parts of said main plane, and wings extending outwardly and upwardly from the longitudinal edges of said body and disposed between said planes.

CHARLES LOUIS FORTIER.